United States Patent [19]

Crowe

[11] 4,282,105
[45] Aug. 4, 1981

[54] FILTER

[75] Inventor: William D. Crowe, San Francisco, Calif.

[73] Assignee: J. R. Schneider Co., Inc., Corte Madera, Calif.

[21] Appl. No.: 116,360

[22] Filed: Jan. 28, 1980

[51] Int. Cl.$^3$ ............................................. B01B 29/40
[52] U.S. Cl. .................................. 210/798; 210/108; 210/410; 210/412; 210/436
[58] Field of Search ................. 210/82, 108, 274, 410, 210/412, 416 L, 791, 797, 798, 436

[56] References Cited

U.S. PATENT DOCUMENTS

| | | | |
|---|---|---|---|
| 2,423,172 | 7/1947 | Booth | 210/82 |
| 2,468,603 | 4/1949 | Pew | 210/410 |
| 3,056,499 | 10/1962 | Liddell | 210/82 X |
| 3,088,595 | 5/1963 | Robb | 210/456 |
| 3,280,978 | 10/1966 | Scott | 210/82 |

*Primary Examiner*—John Adee
*Attorney, Agent, or Firm*—Townsend and Townsend

[57] ABSTRACT

Disclosed is an improved liquid filter in which contaminated liquid is pumped into an inlet chamber, through a filter element, into an outlet chamber and out of the filter through an outlet pipe. The inlet and outlet chambers have compartments which hold compressed air. When the filter element becomes clogged with contaminants, inlet and outlet valves are closed, sealing off the filter. A vent valve is then opened to quickly exhaust the compressed air in the inlet air compartment. This allows the compressed air in the outlet air compartment to energetically force liquid back through the filter element thereby dislodging the deposited contaminants. The compartments and a liquid column between them are sized so that a discharge of liquid from the inlet compartment during the venting thereof is prevented. Both air compartments are kept full of air regardless of the internal filter pressure by continuously bleeding air into the inlet air compartment from where excess air bleeds into the outlet compartment to assure sufficient backwashing air and air pressure under all operating conditions. The filter has a tangential inlet nozzle which facilitates the removal of heavier contaminants before they reach the filter element.

33 Claims, 1 Drawing Figure

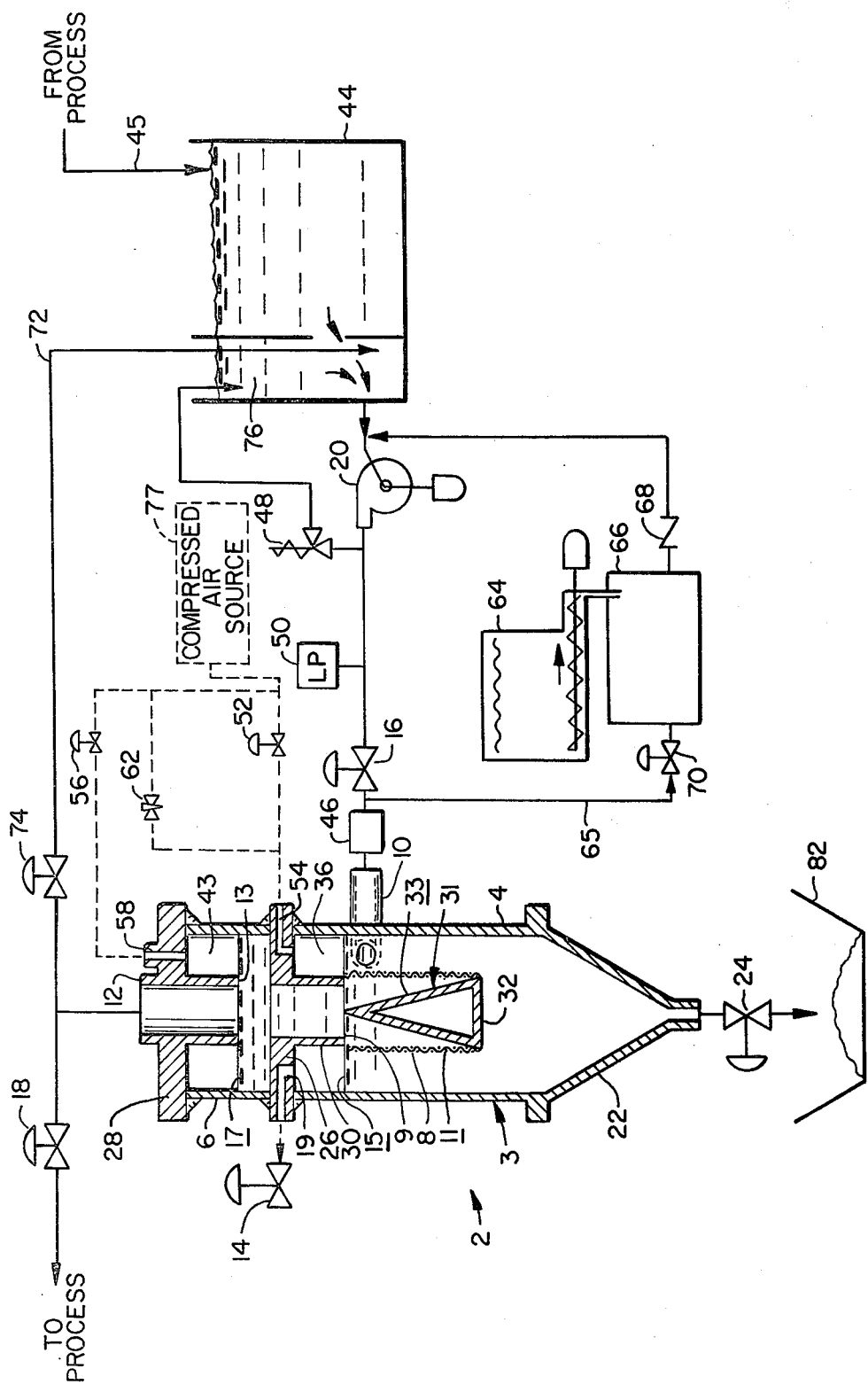

FILTER

This invention relates to a strainer or filter, particularly one which is capable of cleaning large volumes of fluid and which is quickly backwashed with a minimum of operator participation.

BACKGROUND OF THE INVENTION

Large plate filters employing paper filter elements are often used for filtering operations in which the object is to cleanse large quantities of liquid, for example cleaning oil used during metal rolling operations or during metal can manufacture. The filtering units are relatively expensive and so is the non-reusable filter paper employed by them. Changing filter paper can also be quite time-consuming.

One way to reduce the cost and time associated with changing filter paper is to use filters that can be backwashed to remove the contaminants deposited thereon. A problem associated with backwashing is that if a pump is used to do so, the head which the pump must develop for backwashing may be many times greater than is necessary for the filtering operation. It has been found that the use of a volume of compressed air to force a portion of the liquid in the filtering apparatus back through the filter element works well to dislodge the filter cake. This method eliminates the need for a larger pump solely for backwashing. U.S. Pat. No. 2,423,172 to Booth discloses backwashing by means of compressed air. However, Booth merely discloses to provide compressed air which is used to force backwash water in a counterflow direction through the filter. No consideration is given to the volume of air that is employed, or to changes in the volume of air due to changes in the pump pressure or a change in pressure drop across the filter element. Depending on the pump pressure and the pressure drop across the filter element when the filter is backwashed, the amount of backwashing liquid that is forced through the filter is essentially uncontrolled. To prevent backwashing liquid from being ejected from the filter it was necessary to precisely time the operation of a dual valve system. Failure to properly sequence the valves could lead to a discharge of liquid from the filter which is highly undesirable and could lead to injuries to persons and damage to surrounding property unless adequate safeguards are provided.

Other patents which may be of interest are U.S. Pat. Nos. 3,056,499; and 3,280,978.

SUMMARY OF THE INVENTION

The present invention provides an improved liquid strainer or filter having an inlet chamber and an outlet chamber with a filter element between the two and which is backwashed by suddenly releasing a volume of compressed air on the upstream side of a filter, e.g. in the inlet chamber to the atmosphere; this allows a volume of compressed air on the downstream side to force a controlled volume of liquid back through the filter element and thus dislodge a filter cake of contaminants from the upstream surface of the filter.

During normal filtering, contaminated liquid is pumped into the inlet chamber, through the filter element, into the output chamber and out of the strainer through an outlet pipe. The inlet and outlet chambers have compartments which hold compressed air while the strainer is operating. When the filter element becomes clogged with contaminants, the normal flow of liquid is halted by closing appropriately located inlet and outlet valves. A quick exhaust valve communicating with the upstream air compartment (in the inlet chamber) is then opened thereby allowing the compressed air in the inlet chamber to be quickly vented. This permits the compressed air in the outlet chamber to energetically force liquid back through the filter element thereby dislodging the contaminants deposited on the upstream side of the filter element. The inlet and outlet air compartments, and the volume of water between them that is forced through the filter element during backwashing are sized so that substantially no liquid reaches the quick exhaust valve. In this manner no liquid is discharged from the exhaust valve and the heretofore necessary dual valve venting system, and the precise sequencing required thereby, are eliminated.

Both air compartments are kept full of air during normal filtering regardless of the pump pressure by continuously bleeding air into the inlet air compartment, which in turn bleeds into the outlet air compartment, thus insuring that sufficient air is always available for backwashing.

In general, therefore, the present invention provides a backwashable filter for the removal of particulate contaminants from a contaminated, incoming liquid which comprises a vessel that includes a bulkhead separating it into upper and lower chambers, the lower chamber including an inlet and the upper chamber including an outlet. A fluid passage is defined between the chambers and a screen is interposed between the inlet and the fluid passage so that incoming liquid is filtered by the screen before it enters the upper chamber and hence the outlet. A first, compressed gas holding compartment is defined by the lower chamber and holds a volume of pressurized gas on the upstream side of the screen. A second gas holding compartment is defined in the upper chamber and it holds a second volume of pressurized gas which is used to backwash the filter in the manner described below.

A vent valve communicates with the first compressed gas compartment via a port for selectively venting the gas therefrom. After appropriately closing the inlet and outlet of the filter and upon opening the vent valve, gas from the first compartment rapidly escapes, typically to the atmosphere surrounding the vessel, thereby dropping the pressure in the first compartment to atmospheric pressure. This, in turn, causes the compressed gas in the second compartment in the upper chamber to rapidly force a water column between the second compartment and the first compartment in a counterflow direction, that is, in an upstream direction, through the fluid passage into the lower chamber and hence the first compressed air compartment. This rapid counterflow of liquid dislodges the filter cake adhering to the screen and suspends dislodged contaminants in the surrounding liquid for subsequent drainage.

To prevent a discharge of liquid through the vent valve, the first and second compartments as well as the water column therebetween are sized and arranged so that the liquid level in the first compartment remains at all times below the discharge port. In other words, the volume between the liquid level in the lower chamber during normal filtering and the level of the discharge port exceeds the maximum volume of liquid that can be forced in a counterflow direction during backwashing. Although this can be achieved in a variety of ways, e.g. by controlling the entire volume of compressed air in the second compressed air compartment, it is more readily and accurately controlled by appropriately sizing and positioning key components of the filter.

In this regard, the present invention contemplates that the fluid passage between the upper and lower chambers be defined by a generally upright flow tube extending through the bulkhead and terminating in a lower end spaced from the bulkhead, a generally upright outlet pipe depends from the top of the vessel into the upper chamber and has a free end located above the bulkhead so that when liquid flows through the filter during normal filtering operations, the liquid forms liquid levels coincident with the lower end of the flow tube and the lower end of the outlet pipe, respectively. Gas is thereby trapped in the first and second compartments of the lower and upper chambers, respectively. The volume of liquid disposed between the lower end of the flow tube and the lower end of the outlet pipe is then chosen so that it is less than the volume of liquid that must be added to the first chamber (when the vent valve is opened) to raise the liquid level to the discharge port. In this manner, an accidental discharge of liquid from the port and the vent valve is prevented irrespective of the volume of compressed air in the upper, second compressed air compartment. Once the entire liquid column has been forced into the lower, first compressed air compartment, additional compressed air simply flows through the lower compartment and out through the vent valve. Thus, the present invention positively avoids heretofore sometimes troublesome accidental discharge of liquid when backwashing a filter with volumes of compressed air. Yet, the need for complicated, relatively expensive and difficult to properly operate dual valve discharge systems, such as the one disclosed in the above-referenced Boothe patent, is eliminated.

In addition, the present invention contemplates to maintain the entire compressed air compartment filled with compressed air irrespective of the internal liquid pressure in the vessel so that an increase of the liquid pressure, for example, will not result in a reduction of the respective compressed air volumes. In this regard, the present invention provides means for bleeding compressed air at a relatively slow rate into the first air compartment, either on a continuous basis or on a selective, e.g. manual, basis. This will fill the entire first compartment with compressed air and maintain the liquid level in the lower chamber commensurate with the level of the lower flow tube end. Excess air bled into the compartment enters the flow tube and rises vertically along its walls and through the liquid in the upper chamber directly into the upper compressed air compartment until that compartment is filled to thereby maintain the proper volume of liquid in the upper chamber and to provide sufficient air for backwashing under any operating conditions.

To assure that the air rising through the flow tube enters the upper compressed air compartment, the outlet pipe is preferably concentrically disposed above the flow tube and given a lesser diameter than the inner diameter of the flow tube. As a consequence, most if not all air bubbles rising from the flow tube will not enter the outlet pipe but instead will enter the upper compressed air compartment. Excess air from the upper compartment will then enter the outlet pipe and leave the filter. Since the levels of air in the compartments determine the corresponding liquid levels in the compartments, maintaining the levels of air at chosen positions likewise maintains the liquid levels at correspondingly chosen positions. Consequently, inadequate backwashing due to an inadequate volume of air in the upper compartment, or an overfilling of the lower compartment with liquid and a resulting discharge of liquid through the vent valve during backwashing, is prevented.

This ability to maintain both compartments completely filled with compressed air at all times has an additional advantage in that it avoids the need for adjusting the air volumes before backwashing. Thus, when backwashing becomes necessary, valves in the inlet to the lower chamber and the outlet from the upper chamber are closed and the pressures in the two compressed air compartments can be simultaneously adjusted to provide for an optimal backflushing rate. This assures that the filter cake will not be prematurely dislodged during an attempt to change the air volumes prior to backwashing. If such adjustments had to be independently made, flow volumes of gas and/or liquid in one or the other direction to attain the proper balance, the filter cake might be damaged which, in turn, might adversely affect the backflow pattern and result in a poor backwashing performance.

The backwashing performance of a filter constructed in accordance with the present invention is further enhanced by constructing the screen as a relatively efficient, yet inexpensive cylindrical screen which depends directly from, i.e. is a continuation of, the upright flow tube. A liquid impervious conical member defines the lower, free end of the sieve and its tapered side converges in the vicinity of the free end of the flow tube. During backwashing the liquid rushing in an upstream direction through the flow tube and into the cylindrical screen is given a radial component which aids in dislodging the filter cake. Further, the gradual reduction in the interior cross-section of the screen caused by the impervious deflector cone assures a generally uniform flow rate through all portions of the screen, both proximate to and relatively remote from the free flow tube end. This further enhances the efficiency and uniformity with which the filter cake is removed during backwashing.

A further feature of the present invention contemplates to arrange the inlet into the lower chamber so that the entering liquid is given a swirling motion. For that purpose, the inlet is generally tangential with respect to the vessel (which is preferably an upright, cylindrical vessel) and horizontal. As a result of the induced swirling motion, larger and heavier contaminants are centrifugally moved away from the centrally located screen towards the vessel walls where they gravitate towards the bottom of the lower chamber. They are there collected and intermittently withdrawn, e.g. drained through a bottom drain valve.

For the removal of small contaminants, say in the micron size, it is frequently desirable if not necessary to utilize a filter aid such as diatomaceous earth. This filter aid is introduced into an otherwise clean liquid which is circulated across the filter screen, that is from the lower into the upper chamber, in a closed loop while metered amounts of filter aid are added into the circulating liquid at a point upstream of the filter screen. As the liquid circulates a porous filter cake builds up on the upstream surface of the screen which aids in the subsequent filtration of fine particles from the contaminated liquid.

The tangential orientation of the inlet nozzle quite surprisingly facilitates the filtration process when a filter aid is used. Conventional wisdom and practice teach that tangential velocity components should be avoided in the introduction of the contaminated liquid into the inlet chamber, particularly when a filter aid is used. Quite unexpectedly, filter aid segregation and a resulting uneven distribution of the filter aid cake on the screen and a resulting lower filtration efficiency are not encountered. To the contrary, a better filter aid cake distribution has been encountered when using tangential inlet nozzles as compared with conventional radial or axial baffle nozzles. Therefore, the tangential inlet nozzle combines the large particle settling features of a hydro-cyclone entry without losing the ability to use the unit with or without a filter aid.

BRIEF DESCRIPTION OF THE DRAWING

The drawing shows, in cross-section, a filter constructed in accordance with the present invention and further schematically illustrates the installation of the filter in an overall liquid filtering-filter backwashing system.

DESCRIPTION OF THE PREFERRED EMBODIMENT

Referring to the drawing, a filter 2 constructed in accordance with the invention broadly comprises a preferably cylindrical, upright housing 3 which defines a lower, inlet container 4 and an upper outlet container 6. A bulkhead 26 separates the containers and includes a vertical and cylindrical flow tube 30 that is concentric with the filter housing to establish fluid communication between the containers. A tubular filter element or screen 8 of substantially the same diameter as the flow tube depends from a lower end 9 thereof and is disposed within the lower container. A cover 28 closes the upper end of the upper container and includes a vertical outlet pipe 12 which depends downwardly from the cover and is aligned with the flow tube.

In operation contaminated liquid enters the lower container through an inlet nozzle 10, passes through screen 8 and from there rises as cleaned liquid through flow tube 30, the upper container and leaves the filter through outlet pipe 12. As the liquid passes through the screen, contaminants are filtered out and are deposited on an upstream side 11 of the screen as a filter cake. As filtering continues, the filter cake becomes progressively thicker, thereby causing an increasing pressure drop between the upstream and downstream sides of screen 8 which in turn reduces the flow rate therethrough. When the filter cake has reached a given thickness, usually determined by sensing a pressure drop across the screen of a predetermined magnitude, the filter is backwashed to remove the filter cake so that efficient filtration can continue.

According to the present invention, the filter is rapidly backwashed with a minimal amount of backwashing liquid by enabling a compressed gas, usually air, to force the backwashing liquid rapidly in a counterflow direction, that is in an upstream direction, through the screen. The filter cake is thereby dislodged and suspended in the contaminated liquid in the lower container 4. The dislodged filter cake and contaminants can be drained as is further described below. To enable such backwashing, flow tube 30 depends downwardly from bulkhead 26 so that its lower end 9 is spaced therefrom. Similarly, outlet pipe 12 depends downwardly from cover 28 so that its free, or lower, end 13 is spaced apart from both the cover 28 and the bulkhead. In this manner, the upper portion of the lower container, that is the portion above lower end 9, defines a lower compressed air compartment 36. Similarly, the upper portion of the upper container defines an upper compressed air compartment 43 in the space above the free end of outlet pipe 12.

During normal operations, these compartments are filled with air of a pressure equivalent to the liquid pressure in the respective containers. Both compartments are maintained filled with compressed air in the manner more fully described below so that the respective liquid levels 15, 17 in the lower and upper containers are coincident with the lower ends 9 and 13 of tube 30 and outlet pipe 12, respectively. Further, the lower compartment is provided with an air exhaust port 19, preferably located in the uppermost portion of the air compartment, which communicates with the exterior of the filter via a quick release vent valve 14.

When backwashing is necessary, the normal filtration flow of liquid through the filter is discontinued by closing an inlet valve 16 and an outlet valve 18 so that no fluid flow through either the inlet or the outlet can take place. Vent valve 14 is opened so that the compressed air in the lower compartment 36 can escape, thereby substantially instantaneously dropping the pressure in the lower compartment to atmospheric pressure. The excess pressure in the upper air compartment 43 now rapidly forces a liquid column, that is the volume of liquid between upper and lower levels 17 and 15, in a counterflow direction, thereby rushing the liquid through the screen 8 and dislodging the filter cake built up on the upstream side thereof. The filter cake thereby disintegrates into particles of various sizes which are suspended in the contaminated liquid disposed in the lower container 4 on the upstream side 11 of the screen. The dislodged filter cake can be removed from the lower container by opening a drain valve 24 disposed at the bottom of a conically shaped lower end 22 of the container. Thereafter, upon closure of both the vent valve 14 and the drainage valve and the opening of inlet and outlet valves 16, 18, normal filtration can continue.

To enable the above summarized backwashing without spilling liquid to the exterior through the vent valve and/or without requiring elaborate control means to discontinue the escape of air from the lower air compartment before liquid reaches the exhaust port 19, and without requiring a costly system for catching liquid that may escape from the vent valve, the amount of liquid that can enter the lower compressed air compartment 36 is limited. Preferably, this is done by sizing the lower compartment 36 so that the volume of the compartment between liquid level 15 and the level of exhaust port 19 that can be filled with liquid during backwashing exceeds the volume of the liquid column between the two liquid levels which can be forced in a circular flow direction by the air in the upper compartment 43. In other words, in the illustrated embodiment in which the port is in bulkhead 26, the volume of the lower compartment 36 is greater than the volume of the water column.

In this manner backwashing liquid forced upstream by the compressed air in the upper compartment cannot raise the liquid level in the lower container as high as the exit port. As a result, the exit port at all times communicates with an air filled portion of the lower compartment and substantially no liquid can escape through the vent valve.

This has a dual advantage. First, since it is not possible to discharge liquid during backwashing, the vent valve can open directly to the atmosphere. Secondly, the upper air compartment 43 can be somewhat enlarged relative to the lower compartment if desired. In particular, in instances in which optimal backwashing is accomplished by rushing the backwash liquid through the screen at relatively high speeds, the upper compartment can be relatively large, e.g. substantially larger than both the lower compartment and/or the volume of the liquid column, so that relatively high air pressure acts on the water column until substantially the entire column passed through the screen. Excess, expanding air from the upper compartment then simply rises through the contaminated liquid which had entered the lower compartment and escapes harmlessly to the atmosphere through valve 14.

Of course, other means for controlling the amount of backwash fluid that can enter the lower air compartment 36, such as limiting the volume and pressure of compressed air in the upper chamber, can be employed. However, this is a generally more difficult and less reliable manner of preventing the escape of liquid to the atmosphere.

To further facilitate the backwashing and assure a uniform removal of the entire filter cake that has built up on the upstream side of screen 8, a liquid impervious conical member 31 is positioned within the cylindrical screen 8. It defines a liquid impervious lower end 32 of the screen and a conical surface 33 which has its apex at about the lower end 9 of the flow tube. The provision of the conical member has a dual advantage. First, the cone imparts to the counterflowing backwash liquid a radial flow component which facilitates the dislodging of the filter cake. Secondly, it progressively decreases the available cross section on the interior of the screen through which backwash liquid can flow and thereby assures a relatively uniform flow rate of liquid over the entire surface area of the screen irrespective of the distance from the lower end 9 of flow tube 30. In this manner a complete and uniform removal of the filter cake from the screen is assured and the danger that liquid will bypass filter cake portions that are more difficult to remove is substantially lessened if not eliminated.

To assure that no backwash liquid is discharged from the lower compartment 36 through vent valve 14 it is necessary to maintain the lower compartment completely filled with compressed air during normal filtering. When filtering initially commences and contaminated liquid enters the lower container 4 through inlet nozzle 10, air of atmospheric pressure is entrapped in the lower compartment as the liquid level rises above the lower end 9 of flow tube 30. However, when the liquid in the lower container becomes pressurized the entrapped air is compressed and its volume is correspondingly decreased. Consequently, liquid level 15 rises above the lower end of the flow tube and, upon backwashing, there exists the danger that liquid will escape from the compartment unless it is at all times kept filled with air.

To do so, air from a compressed air source 77 is introduced into the lower air compartment 36 through an air conduit 54 in bulkhead 26 via a first air valve 52. Since it is normally also desirable to maintain the upper air compartment 43 completely filled with air, although that may not be necessary for preventing the discharge of liquid through vent valve 14 if, for example, the volume of the water column is substantially less than the volume of the lower air compartment 36, compressed air is also introduced into the upper air compartment via a second air valve 56 and an air conduit 58 in cover 28.

Even though the compartments are initially filled with compressed air, the varying pressure drop across the filter as the filter cake builds up, changes in the pump pressure, and the like can vary the liquid levels 15, 17 during normal filtering. To assure that the air compartments remain air filled, compressed air is allowed to bypass valve 52 and flow at a low rate of say a bubble every ten seconds through a needle valve 62 into the lower air compartment 36. Such a low air bleed rate does not affect the proper operation and pressure balances of the filter but assures that the lower compartment is at all times completely filled with air.

Once the lower compartment is filled (which assures that no liquid escapes through the vent valve during backwashing) additional air bled into it escapes through the uppermost regions of screen 8 into flow tube 30 and rises along its interior walls into the upper container 4. Outlet pipe 12 is given a significantly smaller diameter than that of the flow tube so that the rising air bubbles enter the upper air compartment 43 and not the outlet pipe, thereby filling the upper compartment with the excess air escaping from the lower compartment. After the upper compartment is filled with air, excess air therefrom rises out of the filter through outlet pipe 12.

As an alternative, a needle valve (not shown) can be provided to bypass air valve 56, so that air from source 77 can be directly supplied to the upper air compartment through cover conduit 58. In such a case, the relative sizes and placement of flow tube 30 and of outlet pipe 12 are not critical.

Lastly, to facilitate the removal of relatively large and/or heavy contaminants from the liquid entering the lower container 4 through inlet nozzle 10, the nozzle is preferably tangentially and horizontally oriented relative to the lower container wall. As a result, the incoming liquid is given a swirling motion whereby centrifugal forces cause the larger/heavier contaminants to drift radially outward away from screen 8. There these particles can slowly gravitate towards the conically shaped lower end 22 of the filter where they collect. They can be periodically discharged, either separately or as part of the backwash operation when the dislodged filter cake particles are removed from the lower container after backwashing. In this manner, the larger contaminants do not become part of the filter cake which both reduces the rate with which the filter cake accumulates and further eliminates the possibility of a disturbance of the filter cake by excessively large contaminants.

The operation of filter 2 of the present invention should now be apparent. To briefly summarize it, contaminated liquid, say from a metal can manufacturing process, initially flows into a holding tank reservoir 44 via an intake pipe 45. A pump 20 withdraws liquid from adjacent the bottom of the reservoir and feeds it to inlet nozzle 10 via a flow controller 46 which is of conventional construction and may, for example, comprise a commercially available flow controller such as is available from Griswold Controls of Santa Ana, Calif. The controller assures that the contaminated liquid flow to the inlet nozzle remains constant over a range of pump pressure fluctuations and changes in the pressure head produced by the pump as a result of the build up of the filter cake on screen 8. A pressure relief valve 48 downstream from pump 20 prevents an overheating of the pump when inlet valve 16 is closed by allowing some contaminated liquid to be recirculated to reservoir 44. A low pressure sensor 50 is preferably provided to sense when pump pressure is lost and it is utilized for automatically closing the inlet and outlet valves 16, 18 when such a pressure loss occurs.

Contaminated liquid entering the lower container 4 of filter 2 via the tangential nozzle 10 swirls in the container, thereby precipitating relatively large and/or heavy contaminants, and flows radially inward through screen 8 where the screen together with the filter cake thereon removes contaminants from the liquid so that a cleansed liquid rises through flow tube 30 into the upper container 6 and hence through outlet pipe 12 and outlet valve 18 back to the manufacturing process for reuse and ultimate return to the reservoir as contaminated liquid. The upper and lower air compartments 36, 43 are maintained filled with compressed air as was described above. When the filter cake that continuously builds up on the upstream side 11 of screen 8 reaches a predetermined thickness, a backwash cycle is initiated. Preferably this is determined with a pressure switch (not shown) which senses the differential pressure between the lower and upper containers 4, 6.

The initiation, sequencing and termination of the backwash cycle is preferably accomplished with mechanical, electromechanical or electronic controls (not separately shown) such as a motor operated set of cams (not shown) which sequences the following steps.

First the differential pressure switch causes the energization of the cam motor for one complete cycle, which in turn closes inlet and outlet valves 16, 18. The vent valve 14 is now opened for a short period during which time the compressed air in the lower compartment 36 is exhausted to the atmosphere, thereby dropping the pressure in the lower compartment to atmospheric pressure. The compressed air in the upper compartment 43 now forces the water column between levels 15 and 17 rapidly through screen 8 into the lower compartment 36. The liquid column rushing through the screen dislodges the filter cake on its upstream side 11. Because the volume of the liquid column is less than the volume of the lower air compartment 36, the rising liquid level therein will not reach exhaust port 19 and no liquid is discharged through vent valve 14.

The vent valve is now closed and drain valve 24 is opened to discharge the contaminated liquid in lower container 4 together with the dislodged filter cake suspended therein into a receptacle 82. To facilitate the drainage of the lower container, the motor actuated cams may open either one or both air valves 52, 56 to build up a pressure head within the filter. The backwash collected in receptacle 82 may be filtered separately to recover the liquid. Thereafter, the drain valve 24 and air valves 52, 56 are sequentially closed, the inlet and outlet valves 16, 18 are opened, the cam motor is deenergized and filtering can recommence, thereby completing the backwash cycle.

In many instances, it will be necessary to remove from the contaminated liquid contaminants of very small size, typically down into the micron range. Such contaminants are sometimes impossible to remove with conventional screen filters and it becomes necessary to "coat" the screen 8 with a filter aid such as the above mentioned diatomaceous earth. In such an event, it is necessary to coat the screen following the backwash cycle with filter aid before normal filtration can commence.

For coating the screen with filter aid, a filter aid feeder 64 supplies a mixer/injector 66 with measured amounts of filter aid. The mixer/injector receives contaminated liquid via a supply line 65 that communicates with the contaminated liquid line downstream of inlet valve 16 and upstream of inlet nozzle 10. In the mixer the filter aid and the liquid are combined and returned to the upstream side of pump 20 via a check valve 68. A valve 70 controls the flow of contaminated liquid through supply lines 65 into the mixer.

Typically, filter aid is added to the contaminated liquid fed to filter 2 in two stages. First, immediately following a backwash cycle a relatively large amount of filter aid is introduced into the incoming liquid during a precoat cycle to quickly build up an initial filter aid cake on the upstream side 11 of screen 8. During precoating, outlet valve 18 remains closed and the liquid is recirculated via a valve 74 and a return line 72 to a recirculation portion 76 of reservoir 44 to prevent both filter aid and contaminated liquid from flowing into the process where cleansed liquid is employed.

In a second stage, filter aid is supplied at a substantially reduced rate during a so-called body feed cycle and after outlet valve 18 has been opened and return valve 74 has been closed. At that point filter aid is periodically added to contaminated liquid circulated through mixer 66 at a significantly reduced rate. In this manner, filter aid is intermixed with the contaminants that build up as a filter cake on screen 8 and maintain that filter cake porous even though the contaminants are of exceedingly small size which might otherwise lead to an early clogging of the filter cake and thereby of the entire filter. Thus, the body feed cycle significantly prolongs the service time of the filter between backwashing.

The actual filtration when a filter aid is used follows closely the above described operation of the filter without the use of a filter aid. After a predetermined pressure drop is sensed across the screen 8, a backwash cycle is initiated in the above described manner and with controls that correspond to the controls employed in a filter operated without filter aid. After the backwash cycle has been completed, however, and before normal filtration commences, the inlet and outlet containers 4, 6 are filled with liquid and thereafter screen 8 is precoated with filter aid by initiating an additional precoat cycle.

During the precoat cycle, outlet valve 18 remains closed while inlet valve 16 and recirculation valve 74 are open. The filter aid mixer/injector feeds a mixture of liquid and filter aid to the input of pump 20 which flows the mixture from the filter aid mixer/injector and liquid from reservoir 44 through inlet nozzle 10 into the inlet container and through screen 8 and valve 74 back to the reservoir 76. The filter aid collects on the upstream side 11 of the screen and forms a filter aid cake. When the filter aid cake has the required thickness, feeder 64 stops providing the filter aid mixer/injector 66 with filter aid or reduces the rate at which filter aid is added. The system continues to recirculate the liquid for a period of time to ensure that the filter aid suspended in the liquid is deposited on the screen. Normal filtration can now commence in the above described fashion after recirculation valve 74 has been closed and outlet valve 18 has been opened.

I claim:

1. An improved filter for the removal of particulate contaminants from a contaminated incoming liquid comprising:
   a vessel defining first and second chambers and including bulkhead means separating the chambers, the vessel having an inlet communicating with the first chamber and an outlet communicating with the second chamber;
   means defining a fluid passage between the first and second chambers;
   screen means disposed in the first chamber and fluidly interposed between the inlet and the passage, whereby incoming liquid is filtered by the screen means before entering the second chamber and hence the outlet;
   first gas holding means for retaining during normal operation of the filter a first volume of pressurized gas in the first chamber and on an upstream side of the screen means;
   second gas holding means for retaining during normal operation of the filter a second volume of pressurized gas in the second chamber;
   vent valve means in communication with the first holding means for selectively venting gas therefrom, whereby upon the opening of the vent valve means the pressurized second gas volume rapidly forces a column of liquid between the second holding means and the upstream side of the screen means in a counterflow direction through the screen means and into the first holding means, thereby dislodging contaminants built up on the upstream side of the screen means;
   the first holding means being positioned and dimensioned and the vent valve means communicating with a portion of the first holding means which is positioned so that a liquid level in the first holding means after said liquid column has entered it does not reach said portion of the first holding means in communication with the vent valve means; and
   means for maintaining the first and second gas holding means substantially filled with gas irrespective of the pressure of the liquid in the vessel.

2. The improved filter of claim 1 wherein the maintaining means includes:
   a source of pressurized gas; and
   means for selectively introducing said gas into said vessel.

3. The improved filter of claim 2 wherein said introducing means includes:
   gas valve means fluidly connecting said source and said first holding means;
   means for flowing excess gas from said first gas holding means to said second gas holding means.

4. The improved filter of claim 2 wherein said introducing means includes means for controllably fluidly connecting said source and said first and second gas holding means.

5. The improved filter of claim 1 wherein said inlet includes a generally horizontally disposed, tangentially oriented inlet nozzle, whereby said nozzle imparts a swirling motion to the incoming liquid in the first chamber and thereby promotes the settling of larger particles of contaminants at a bottom portion of said first chamber.

6. The improved filter of claim 5 further comprising means for selectively introducing a filter aid into the incoming liquid forming a filter aid cake on said screen means to thereby enhance the filtering properties of said filter.

7. A backwashable filter comprising:
   a vessel including a bulkhead forming an upper container and a lower container, a generally upright flow tube depending from the bulkhead into the lower container and terminating in a lower end spaced from the bulkhead, a generally upright outlet pipe depending from the vessel into the upper container and having a free end located above the bulkhead, the lower container including an inlet so that liquid can flow from the inlet through the first container, the tube and the second container into the outlet, thereby forming liquid levels coincident with lower end of the flow tube and the free end of the outlet pipe and entrapping gas in a first section in the lower container above the liquid level therein and in a second section in the upper container above the liquid level therein;
   screen means attached to the flow tube for filtering liquid flowing from the lower container to the upper container, whereby a filter cake of contaminants builds up on an upstream side of the screen means;
   a vent valve fluidly communicating with the first section via a port opening into the first section and located above the liquid level in the lower container; and
   means for feeding a pressurized gas into the first section so as to maintain the first section substantially filled with compressed gas irrespective of the pressure of the liquid in the vessel and the liquid level substantially commensurate with the lower end of the flow tube;
   the flow tube, the upper container and the outlet pipe being arranged and dimensioned so that upon the opening of the vent valve and the exhaust of the compressed gas from the first section the liquid level in the first section remains at all times substantially below the port;
   whereby the filter can be backwashed by opening the vent valve and permitting the compressed air in the second section to rapidly force liquid in the flow tube and in the upper container through the screen means into the lower container, thereby dislodging the filter cake from the screen means and suspending it in the surrounding liquid while substantially no liquid is discharged through the port and the vent valve.

8. A filter according to claim 7 including means for maintaining the second section filled with compressed gas and the liquid level in the upper container commensurate with the lower end of the outlet pipe irrespective of the liquid pressure in the upper container.

9. A filter according to claim 8 wherein the last mentioned means comprises means for continuously bleeding compressed gas at a relatively slow rate into the first section, and means for directing excess compressed gas from the first section into the second section.

10. A filter according to claim 9 wherein the directing means is defined by the flow tube.

11. A filter according to claim 10 wherein the directing means is further defined by arranging the flow tube and the outlet pipe substantially concentrical with respect to each other and substantially vertically, and by providing the flow tube with a larger diameter than the diameter of the outlet pipe so that compressed gas entering the flow tube and vertically rising therein along its walls rises through the liquid in the upper container and hence into the second section.

12. A filter according to claim 7 wherein the screen means has a tubular configuration and depends downwardly from the lower end of the flow tube, and including a generally conically shaped member defining a liquid impervious bottom end of the screen means and extending from the bottom end towards the lower end of the flow tube with a cross-section measured perpendicular to the axis of the flow tube which decreases in an upward direction, whereby the member imparts to liquid entering the lower container from the upper container during backwashing a radial flow component to facilitate the dislodging of filter cake from the screen means.

13. A filter according to claim 12 wherein the flow tube and the screen means are cylindrically shaped, and wherein the conical member defines a true cone having a circular base and an apex positioned proximate the lower end of the flow tube.

14. An automatic strainer for filtering a contaminated liquid comprising:
an inlet container defining a first compartment for holding a first volume of compressed air and having an outlet through which contaminated liquid can be flowed into the container;
an outlet container defining a second compartment for holding a second volume of compressed air and having an outlet;
means for fluidly connecting said inlet container and said outlet container;
screen means for filtering contaminated liquid flowing from the inlet to the outlet container;
an outlet valve fluidly connected to said outlet;
an exhaust valve fluidly connected to said first compartment via an exhaust port in the first compartment for venting the first volume of air to the exterior, whereby the second volume of compressed air energetically forces a column of liquid between the compartments through said screen means when the outlet valve is closed to thereby dislodge the contaminants deposited on said screen means;
means limiting the volume of liquid which is available to enter the first compartment when the exhaust valve is opened so that substantially all of the liquid in the containers remains therein when the exhaust valve is open; and
means for removing liquid within said inlet container after the exhaust valve has been opened.

15. The automatic strainer of claim 14 wherein:
said volume limiting means includes means for slowly introducing small amounts of compressed air into said first compartment; and wherein
said connecting means is configured to allow said slowly introduced air to pass from said first compartment to said second compartment so that both compartments remain substantially filled with air so long as the exhaust valve is closed.

16. The automatic strainer of claim 15 wherein:
said screen means is attached to and extends below said connecting means and is positioned centrally within said inlet container; and wherein
said inlet further comprises a tangential inlet nozzle arranged so that said pumped liquid flows within said inlet container in a generally circular manner around and into said screen means to promote the settling out of larger particles of said contaminants at a bottom of said inlet container.

17. The automatic strainer of claim 16 wherein:
said connecting means has a pipe portion extending into said inlet container;
said first compartment is that portion of the inlet container above a lower edge of said pipe portion;
said outlet further comprises an outlet pipe extending into said outlet container; and
said second compartment is that portion of said outlet container above a lower edge of said outlet pipe.

18. The automatic strainer of claim 17 wherein said inlet container and said screen means are generally circular in cross section.

19. The automatic strainer of claim 14 wherein the said inlet container includes a bottom portion which tapers downwardly, and wherein said removing means includes a drain valve fluidly connected to a lower end of said bottom portion.

20. The automatic strainer of claim 18 further comprising means for selectively introducing a filter aid into said contaminated liquid whereby said filter aid is evenly deposited upon an upstream surface of said screen means by the action of said tangential inlet nozzle.

21. The automatic strainer of claim 20 further comprising:
means for selectively recirculating at least a portion of the liquid flowing through said outlet pipe back into said inlet container thereby facilitating the complete deposition of said filter aid onto said upstream surface;
means for pumping said liquid through said tangential inlet nozzle;
means for controlling the flow rate of said liquid through said inlet nozzle; and
a pressure relief valve fluidly connected to the outlet of said pumping means so that when flow through said inlet nozzle is stopped, said relief valve allows a portion of said liquid to be recirculated around said pump means thereby keeping said pump means from overheating.

22. A method for operating and backwashing a filter having an inlet fluidly connected to an inlet chamber holding contaminated liquid and an outlet fluidly connected to an outlet chamber holding filtered liquid, the inlet and outlet chambers including respective first and second compartments for holding volumes of a compressed gas during normal filtering, portions of the first and second compartments being defined by surfaces of the liquid in the inlet and outlet chambers, respectively, during normal filtering, and liquid filtering screen means disposed between the chambers, the compartments being arranged so that a liquid column is disposed between them which must be moved in an upstream direction before gas can flow from the outlet chamber to the inlet chamber, the method comprising the steps of:
flowing contaminated liquid from the inlet to the outlet to thereby filter the liquid with the screen means by depositing the liquid contaminants as a filter cake on the screen means;
periodically backwashing the screen means to remove the filter cake therefrom by substantially instantaneously discharging compressed gas in the first compartment from a port therein which is located above the contaminated liquid surface, whereby the compressed gas in the second compartment rapidly forces the liquid column in an upstream direction through the screen means, thereby dislodging the filter cake from the screen means and suspending it in the contaminated liquid disposed in the inlet chamber;

maintaining the compartments substantially completely filled with compressed gas irrespective of pressure of the liquid in the chambers; and sizing the volume of the liquid column so that it is less than the volume of liquid necessary to raise the contaminated liquid surface to reach the port, whereby the escape of substantially any liquid from the port is prevented.

23. A method according to claim 22 including the step of providing the second compartment with a volume which exceeds the volume of the liquid column, and wherein the step of backwashing includes the step of flowing gas from the second compartment into the first compartment.

24. A method according to claim 22 including the step of draining from the first chamber the contaminated liquid disposed therein and filter cake particles suspended in the liquid prior to recommencing the step of flowing.

25. A method according to claim 22 wherein the first chamber includes a lower portion and a discharge opening in the lower portion, and wherein the step of flowing includes the steps of imparting to the contaminated liquid entering the first chamber a swirling motion, whereby relatively heavier contaminants gravitate into the lower portion and collect therein, and further including the step of periodically removing from the first chamber contaminants collected at the lower portion.

26. A method according to claim 22 including tube means disposed downstream of the screen means and fluidly communicating the chambers, and wherein the screen means has a generally tubular configuration disposed concentrically with respect to the tube means, and including the step of controlling the liquid flow during the backwashing step so that liquid flowing in an upstream direction flows at a substantially uniform rate through the screen means over substantially the entire extent thereof.

27. A method according to claim 26 wherein the step of controlling includes the step of imparting to the liquid flowing in an upstream direction a flow component which is transverse to the screen means before the liquid reaches the screen means to enhance the dislodging of the filter cake during backwashing.

28. A method according to claim 22 including the steps of closing the inlet and the outlet prior to the step of discharging compressed gas from the first compartment.

29. A method according to claim 22 including the step of applying a cake of a filter aid material to the upstream side of the screen means prior to recommencing the step of flowing.

30. A method according to claim 29 wherein the step of applying comprises the steps of circulating the liquid in a downstream direction through the screen means, and adding to the circulating liquid at a point upstream of the screen means a filter aid material, whereby a filter aid cake builds up on the upstream side of the screen means.

31. A method according to claim 30 including the step of ceasing the circulating step after a filter aid cake of a desired thickness has built up on the screen means, and thereafter recommencing the step of flowing.

32. A method according to claim 22 wherein the maintaining step comprises the steps of substantially continuously directing compressed gas at a relatively low rate into the first compartment, and of passing compressed gas in excess of the volume of the first compartment to the second compartment.

33. A method according to claim 32 wherein the step of passing comprises the step of passing the excess gas from the first compartment, through the screen means and through the liquid column into the second compartment.

* * * * *